United States Patent
Slavchev

(10) Patent No.: US 6,911,126 B1
(45) Date of Patent: Jun. 28, 2005

(54) ELECTROLYTIC REGENERATOR

(76) Inventor: Slavcho Slavchev, 9149 Lime Tree La., Pembroke Pines, FL (US) 33024-4609

( * ) Notice: Subject to any disclaimer, the term of this patent is extended or adjusted under 35 U.S.C. 154(b) by 279 days.

(21) Appl. No.: 10/385,161

(22) Filed: Mar. 11, 2003

(51) Int. Cl.[7] .............................. C25B 1/04; C25B 9/00
(52) U.S. Cl. ...................................... 204/266; 204/242
(58) Field of Search ................................ 204/242, 263, 204/266; 114/256; 205/628

(56) References Cited

U.S. PATENT DOCUMENTS

| | | | | |
|---|---|---|---|---|
| 736,868 | A | * | 8/1903 | McCarty ..................... 205/628 |
| 1,581,944 | A | * | 4/1926 | Hausmeister ............... 205/628 |
| 4,427,319 | A | * | 1/1984 | Mayr .......................... 405/196 |
| 4,490,232 | A | * | 12/1984 | Lapeyre ..................... 205/628 |
| 4,850,190 | A | * | 7/1989 | Pitts ........................... 60/398 |
| 6,833,631 | B2 | * | 12/2004 | Van Breems ............... 204/194 |
| 2002/0145288 | A1 | * | 10/2002 | Van Breems ............... 290/42 |
| 2003/0168864 | A1 | * | 9/2003 | Heronemus et al. ......... 290/55 |

FOREIGN PATENT DOCUMENTS

| | | | | |
|---|---|---|---|---|
| DE | 2801723 | A | * | 7/1979 |
| FR | 2286891 | A | * | 6/1976 |
| JP | 51-016284 | A | * | 2/1976 |
| JP | 55-116601 | A | * | 9/1980 |
| JP | 57-017401 | A | * | 1/1982 |
| JP | 08-158083 | A | * | 6/1996 |
| JP | 08-209373 | A | * | 8/1996 |

* cited by examiner

*Primary Examiner*—Roy King
*Assistant Examiner*—Harry D. Wilkins, III
(74) *Attorney, Agent, or Firm*—Albert Bordas; Jesus Sanchelima

(57) ABSTRACT

An electrolysis system to be used in a salt-water application at a predetermined depth. The electrolysis system comprises two cylindrical tanks that are connected by an ionic bridge. Enclosed within each tank are turbine assemblies attached to a generator by a shaft. An anode coil is secured to one tank near the bottom and a cathode coil is secured to the other tank near its bottom. Electricity is supplied from an external source to power said anode and cathode coils. Once electrolysis starts to occur, oxygen and hydrogen gas emit and travel towards the top of their respective tanks. As the respective gases pass their respective valves, they turn their respective turbines, which enable their respective generators. Once the generators are providing sufficient power for the anode and cathode coils to perform electrolysis, the external power supply is disconnected. Oxygen and hydrogen is then stored.

7 Claims, 6 Drawing Sheets

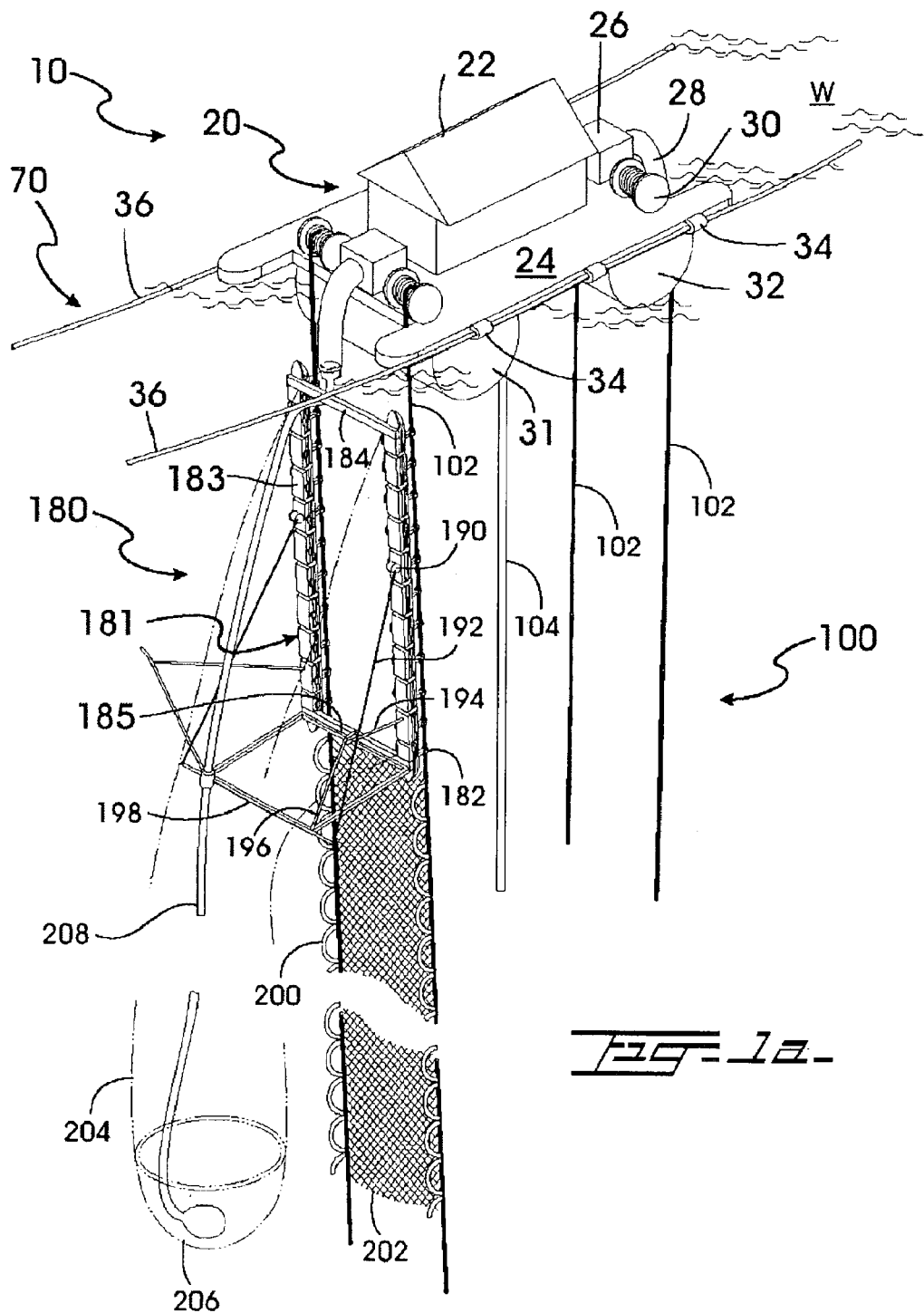

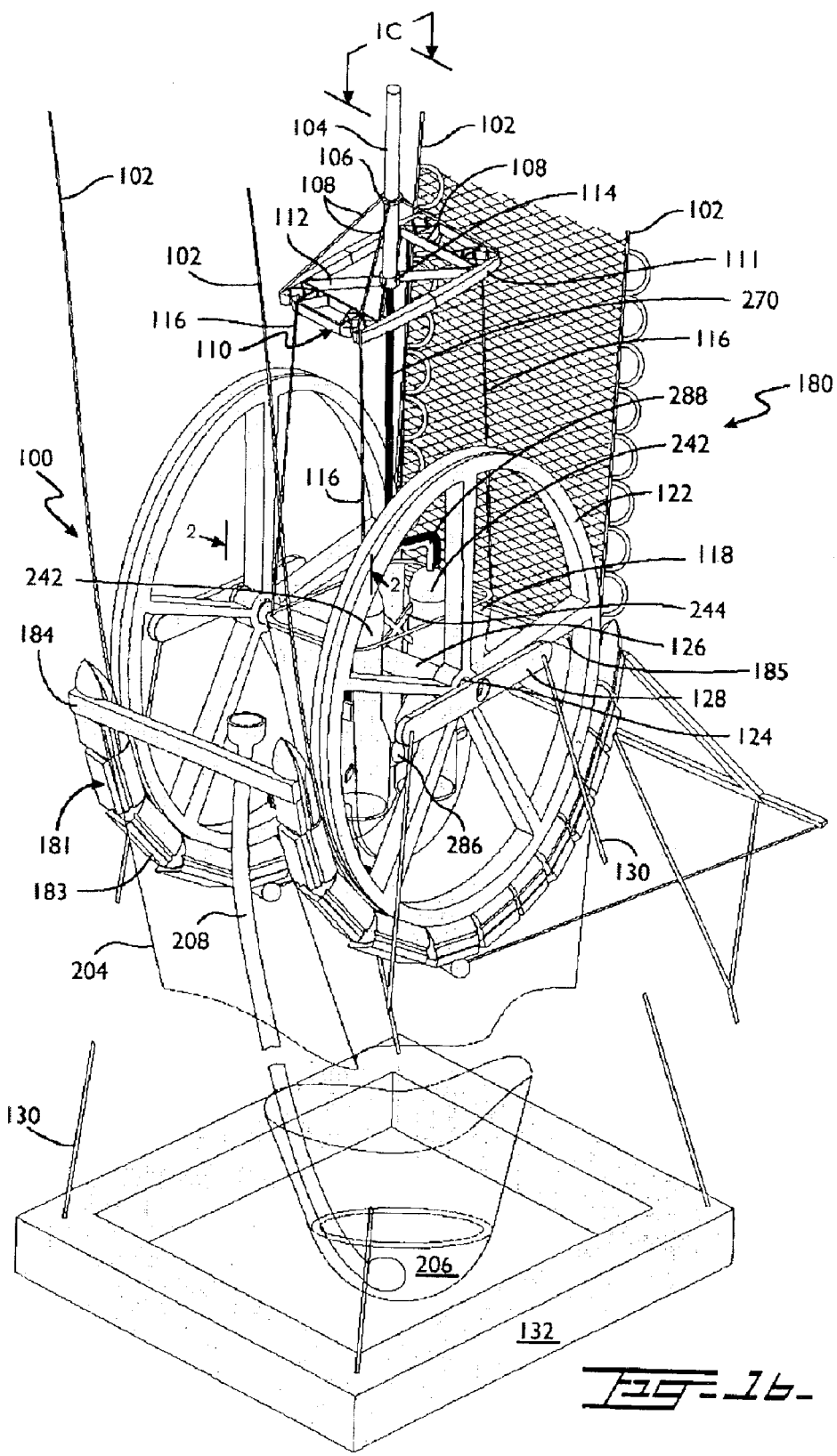

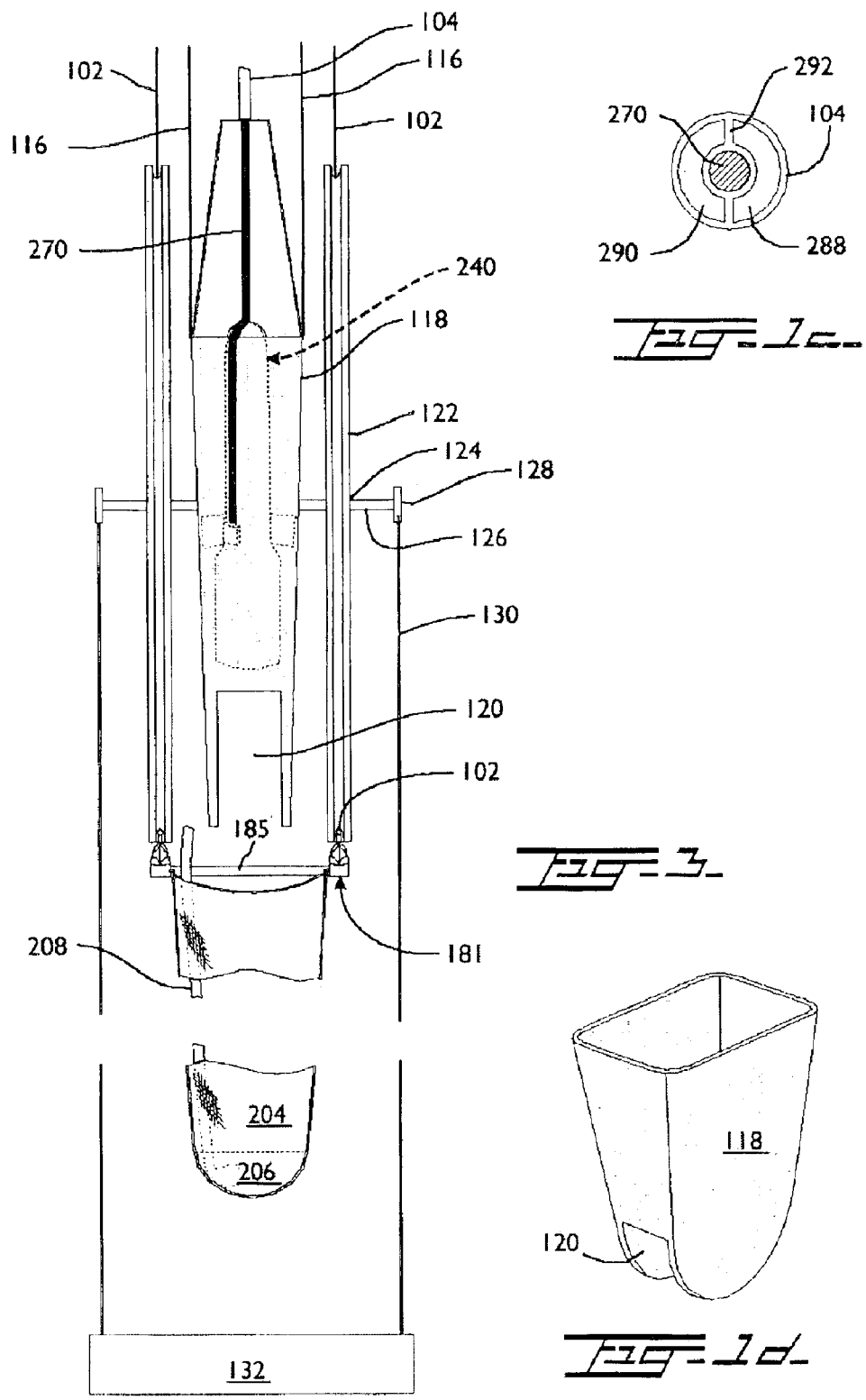

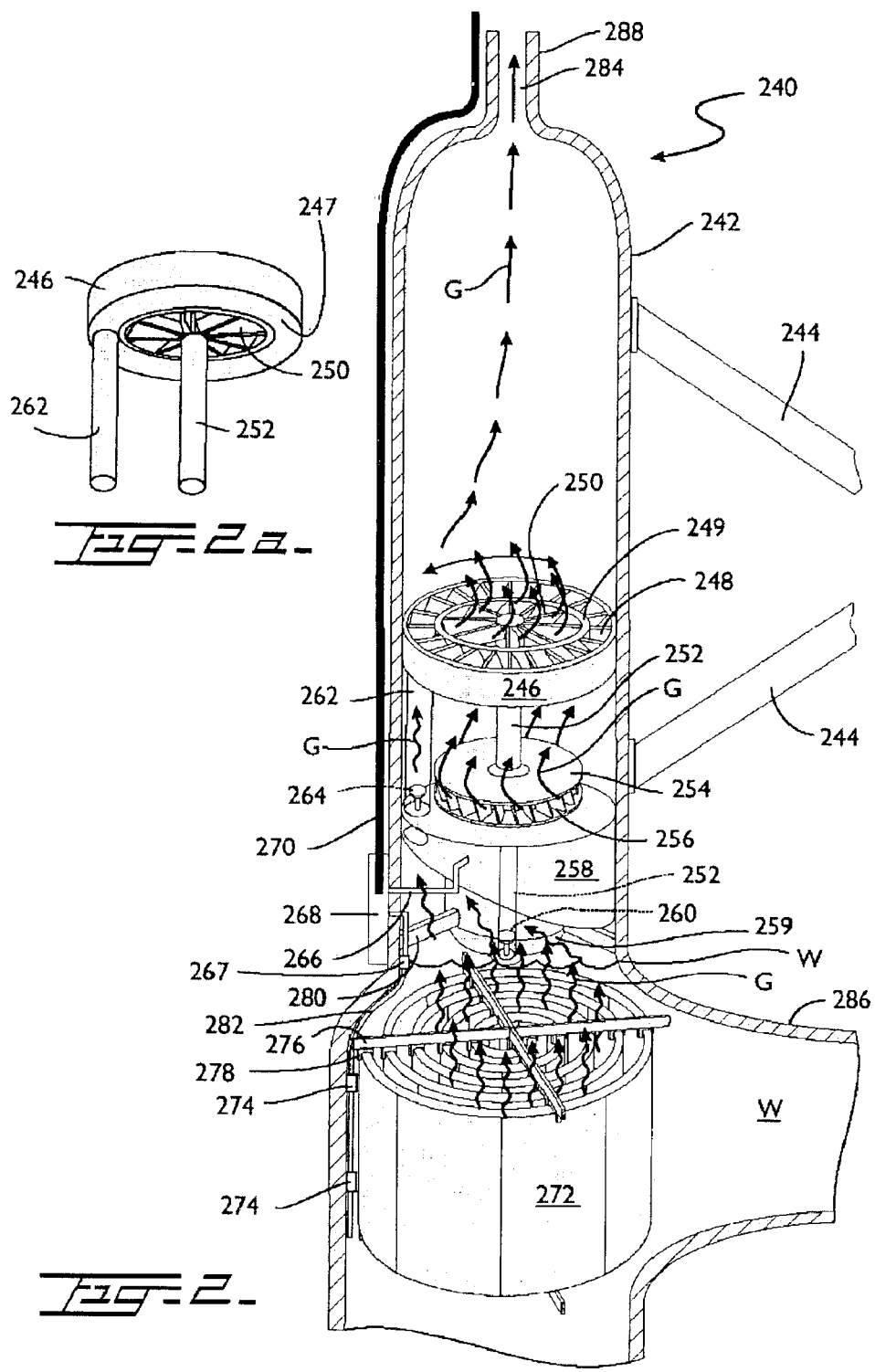

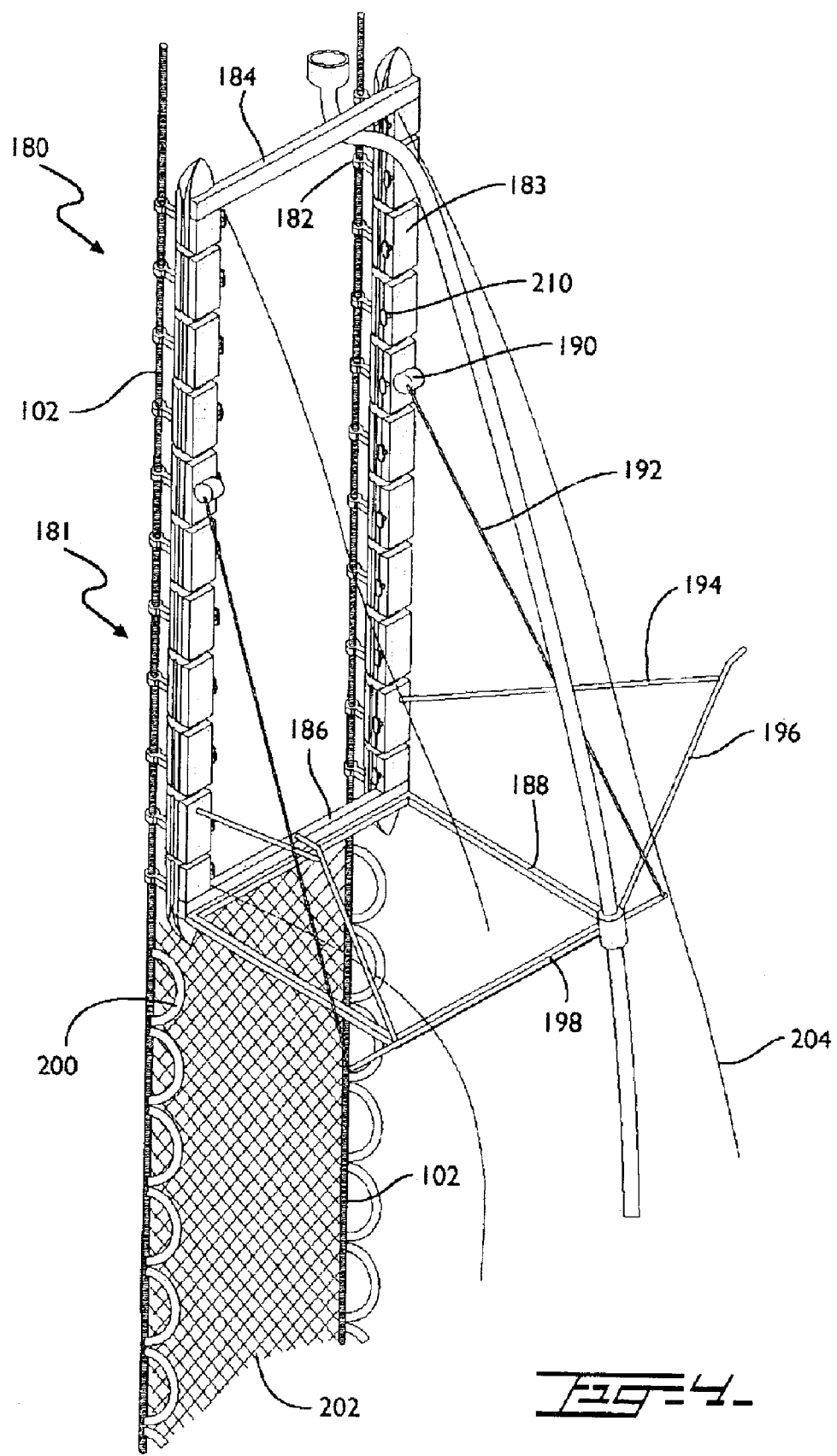

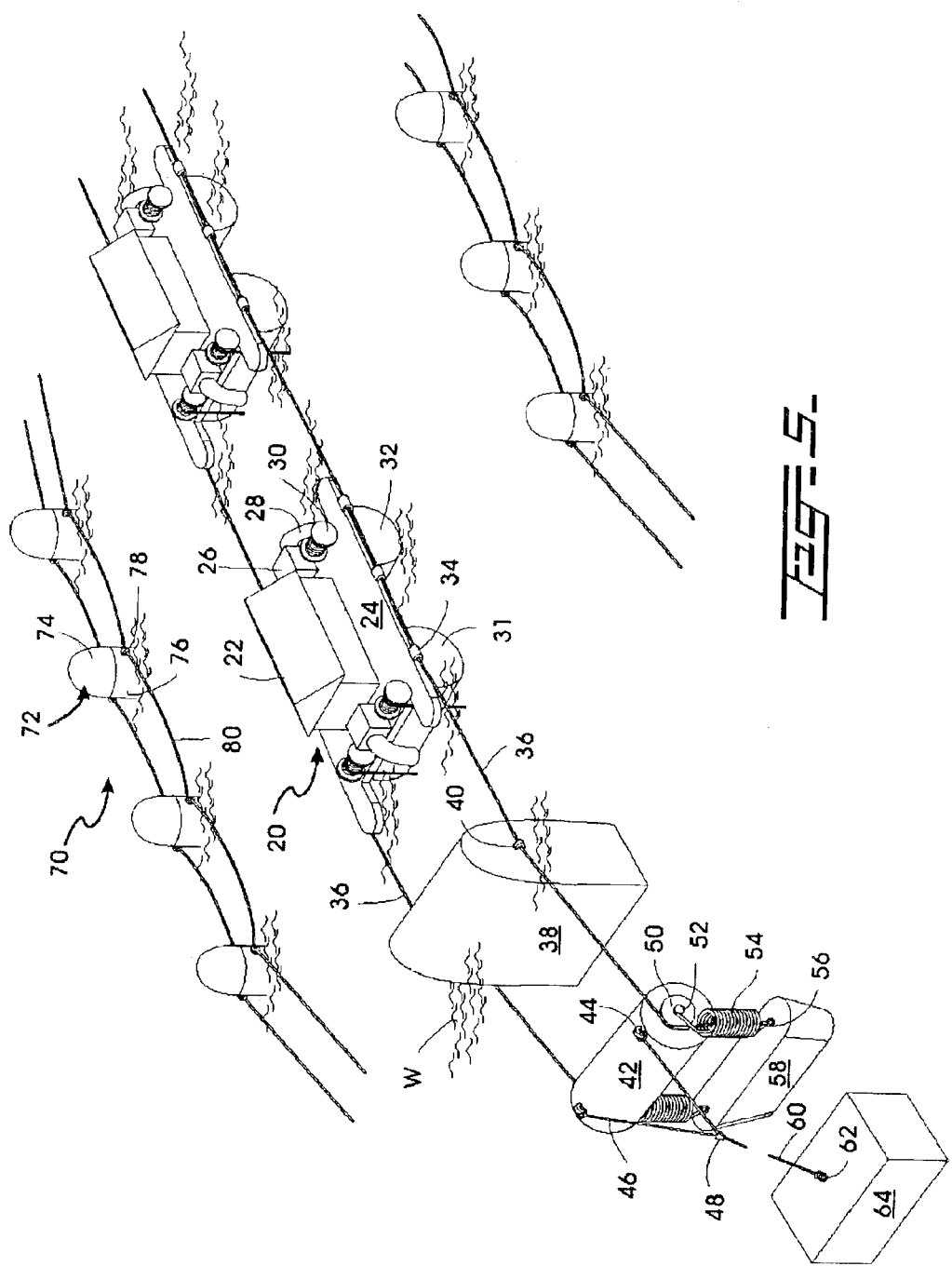

ELECTROLYTIC REGENERATOR

BACKGROUND OF THE INVENTION

1. Field of the Invention

The present invention relates to electrolysis systems, and more particularly, to an underwater apparatus to produce electrolysis.

2. Description of the Related Art

Many designs for electrolysis systems have been designed in the past. None of them, however, include underwater electrolysis tank assemblies comprising turbines that are driven by gas, based on buoyancy principles.

There are no electrolysis systems to the best of applicant's knowledge that utilizes buoyancy principles to drive turbines while underwater to produce electrolysis.

SUMMARY OF THE INVENTION

Electrolysis, is defined as a chemical change, especially decomposition, produced in an electrolyte by an electric current. As detailed in *CHEMISTRY, The Central Science*, seventh edition, by Theodore L. Brown, H. Eugene LeMay, Jr., and Bruce E. Bursten; voltaic cells are based on spontaneous oxidation-reduction reactions. Conversely, it is possible to use electrical energy to cause nonspontaneous redox reactions to occur. For example, electricity can be used to decompose molten sodium chloride into its component elements:

$$2NaCl(l) \rightarrow 2Na(l) + Cl_2(g)$$

Such processes, which are driven by an outside source of electrical energy, are called electrolysis reactions and take place in electrolytic cells.

As detailed in *CHEMISTRY*, third edition, by Steven S. Zumdahl, a similar procedure may be utilized for the electrolysis of water. It is known that hydrogen and oxygen combine spontaneously to form water and that the accompanying decrease in free energy can be used to run a fuel cell to produce electricity. The reverse process, which is of course nonspontaneous, can be forced by electrolysis. As an example:

Anode reaction:

$$2H_2O \rightarrow O_2 + 4H^+ + 4e^- \ \epsilon^0 = -1.23 \ V;$$

Cathode reaction:

$$4H_2O + 4e^- \rightarrow 2H_2 + 4OH^- \ \epsilon^0 = -0.83 \ V;$$

produce a net reaction:

$$6H_2O \rightarrow 2H_2 + O_2 + 4 \ (H^+ + OH^-) \epsilon^0 = -2.06 \ V$$

or $$2H_2O \rightarrow 2H_2 + O_2$$

Note that these potentials assume an anode chamber with 1 M H+ and a cathode chamber with 1 M OH⁻. In pure water, where $[H^+]=[OH^-]=10^{-7}M$, the potential for the overall process is −1.23 V.

In laboratory practice, however, if platinum electrodes connected to a 6-V battery are dipped into pure water, no reaction is observed because pure water contains so few ions that only a negligible current can flow. However, addition of even a small amount of a soluble salt causes an immediate evolution of bubbles of hydrogen and oxygen.

Additionally, there are many ionic constituents that exist in seawater. Such ionic constituents of seawater present in concentrations greater than 0.001 g/kg (1 ppm) are listed in chart 1 below, as illustrated in *CHEMISTRY, The Central Science*, previously mentioned above.

| Ionic Constituent | g/kg Seawater | Concentration (M) |
|---|---|---|
| Chloride, Cl⁻ | 19.35 | 0.55 |
| Sodium, Na⁺ | 10.76 | 0.47 |
| Sulfate, $SO_4^{2-}$ | 2.71 | 0.028 |
| Magnesium, $Mg^{2+}$ | 1.29 | 0.053 |
| Calcium, $Ca^{2+}$ | 0.412 | 0.010 |
| Potassium, K⁺ | 0.40 | 0.010 |
| Carbon dioxide* | 0.106 | $2.41 \times 10^{-3}$ |
| Bromide, Br⁻ | 0.067 | $8.39 \times 10^{-4}$ |
| Boric Acid, $H_3BO_3$ | 0.027 | $4.37 \times 10^{-4}$ |
| Strontium, $Sr^{2+}$ | 0.0079 | $9.02 \times 10^{-5}$ |
| Fluoride, F⁻ | 0.001 | $5.26 \times 10^{-5}$ |

*$CO_2$ is present in seawater as $HCO_3^-$ and $CO_3^{2-}$.

The instant invention is an electrolysis system to be used in a marine application at a predetermined depth. The electrolysis system comprises two cylindrical tanks that are connected by an ionic bridge. Enclosed within each tank are turbine assemblies attached to a generator by a shaft. An anode coil is secured to one tank near the bottom and a cathode coil is secured to the other tank near its bottom. Electricity is supplied from an external source to power said anode and cathode coils. Once electrolysis starts to occur, oxygen and hydrogen gas emit and travel towards the top of their respective tanks. As the respective gases pass their respective valves, they turn their respective turbines, which enable their respective generators. Once the generators are providing sufficient power for the anode and cathode coils to perform electrolysis, the external power supply is disconnected. Oxygen and hydrogen gases are then stored. In the preferred embodiment, the lower portion of the instant invention operates at a predetermined water depth to also collect metals.

More specifically, the instant invention is an electrolysis system comprising a platform assembly with first and second ends. The platform assembly floats on a body of saltwater and has winch assemblies at the first and second ends to winch first and second cables. The platform assembly further has first and second storage tanks fixedly secured thereon, to store oxygen and hydrogen gas respectively.

A stabilizing assembly stabilizes the platform assembly on the body of saltwater.

A pulley assembly has first and second pulleys on the first and second cables respectively. The pulley assembly has an anchor in the body of saltwater.

An electrolysis tank assembly has first and second cylindrical tanks secured between the first and second pulleys. An ionic bridge connects the first and second cylindrical tanks to one another. The first cylindrical tank has an anode coil connected to an external power supply from the platform assembly and the second cylindrical tank has a cathode coil also connected to the external power supply. The first and second cylindrical tanks each have a generator and at least one turbine assembly connected to each other by a shaft.

The electrolysis system has means to produce the oxygen and hydrogen gas with electrolysis, wherein the electrolysis tank assembly is positioned at a predetermined depth within the body of saltwater. The external power supply initiates operation of the anode and cathode coils as an electrical current is applied, creating the oxygen and hydrogen gas respectively. The oxygen and hydrogen gas, in their respective first and second cylindrical tanks, travel through the at least one turbine assembly turning the generator with the shaft. When the generator produces sufficient electrical current for electrolysis, the external power supply is disengaged. The oxygen and hydrogen gas is stored in the first and second storage tanks.

The instant invention further comprises at least one collector assembly fixedly secured to the first and second cables. The collector assembly has a generally rectangular frame assembly, which has a weighted bag removably secured thereon.

With gravity, the instant invention also has means to collect ionic constituents present in saltwater within the weighted bag when the rectangular frame assembly is positioned below the pulley assembly.

The platform assembly further comprises first and second vacuums to vacuum the ionic constituents from the weighted bag when the collector assembly is at the first or second ends. The weighted bag has a vacuum hose, which connects to the first and second vacuums.

Additionally, the first and second cables have a net secured onto one end of the rectangular frame assembly, to prevent the weighted bag from becoming entangled with the first and second cables.

It is therefore one of the main objects of the present invention to provide an apparatus that may produce large quantities of hydrogen and oxygen gas from seawater.

It is another object of the present invention to provide an apparatus that may collect ionic constituents and metals that exist in seawater.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1a represents a perspective view of the upper portion of the instant invention.

FIG. 1b represents a perspective view of the lower portion of the instant invention.

FIG. 1c is a cut view of pipe 104 taken along the line 1c—1c in FIG. 1b.

FIG. 1d is a perspective view of basket 118 seen in FIG. 1b.

FIG. 2 illustrates a cut view of an electrolysis tank assembly taken along the line 2—2 in FIG. 1b.

FIG. 2a illustrates a sectional view of turbine 246 shown in FIG. 2.

FIG. 3 is an elevational side view of a lower portion of the instant invention.

FIG. 4 is a sectional view of the collector assembly.

FIG. 5 is a perspective view of a portion of the platform and stabilizing assemblies.

DETAILED DESCRIPTION OF THE PREFERRED EMBODIMENT

Referring now to the drawings, where the present invention is generally referred to with numeral 10, it can be observed that it basically includes platform assembly 20, stabilizing assembly 70, pulley assembly 100, collector assembly 180, and electrolysis tank assembly 240.

Seen in FIG. 1a is the upper portion of instant invention 10. Instant invention 10 operates in a body of water W. Floating on water W is platform assembly 20. Platform assembly 20 comprises a structure 22, as illustrated, resting upon platform 24. Secured onto platform 24 are vacuum assemblies 26. Attached and extending from each vacuum assembly 26, are hoses 28. On each side of vacuum assembly 26 are winch assemblies 30, which spool cables 102. Secured beneath platform 24, tanks 31 and 32 store oxygen and hydrogen gas respectively. Connected to the edge of platform 24, the opposite edge not seen, are guides 34. Guides 34 allow for cable 36 to pass therethrough and stabilize platform assembly 20.

Hanging below platform 24, thus operating under-water, is collector assembly 180. Collector assembly 180 comprises frame assembly 181, which is fixedly secured onto cables 102 with clamps 182. Frame assembly 181 is generally rectangular and comprises connectors 183 secured to one another, and terminating at connectors 184 and 185. Mounted from two connectors 183 are spools 190. Cables 192 extend from spools 190 and are fixedly secured to the end points of rod 198. Hanging from frame assembly 181 is bag 204. Bag 204 is securely fastened to buttons 210, seen in FIG. 4, to effectively cover the perimeter of rectangularly shaped frame assembly 181. Bag 204 has a weight 206 at the end opposite from where attached to frame assembly 181, to keep the weighted end of bag 204 draped over rod 198 when in the illustrated position. Extending from the lowermost portion of bag 204, where weight 206 is, is vacuum tube 208. Vacuum tube 208 extends through bag 204 and connects with hose 28 of vacuum assembly 26. In the illustrated position, contents collected within bag 204 may be vacuumed out with vacuum assembly 26 through vacuum tube 208. Contents vacuumed may be stored within structure 22. Additionally, extending from platform 24 is tube 104. Specifically, tube 104 attaches to tanks 31 and 32.

Seen in FIG. 1b is the lower portion of instant invention 10. As seen in the illustrated embodiment, each cable 102 wraps over its respective pulley 122 of pulley assembly 100. A predetermined angle existing between pulleys 122 and platform 24 reduces cable vibrations, since pulley assembly 100 will hang beneath platform 24, and due to the difference in water pressure between the two. Pulley assembly 100 comprises two pulleys 122, connected together by shaft 126, which trespasses though hole 124. At each outside face of pulleys 122, are connectors 128. Connectors 128 maintain approximately in a horizontal position as illustrated. Extending from the distal ends of connectors 128 are cables 130. Cables 130 extend to generally square-like weight 132. Weight 132 rests on the floor of the body of water and maintains instant invention 10 stationary.

Tube 104 extends from platform 24 to frame assembly 110. Frame assembly 110 comprises frame 111 having connectors 112, which extend inwardly to ring 114. To maintain structural integrity, frame assembly 110 also has rods 108 that extend upwardly to ring 106. Extending from the corners of frame 111 are cables 116. Cables 116 hang from the corners of frame 111 to support basket 118.

As seen in the illustrated embodiment, frame assembly 181, which is secured onto cables 102 with clamps 182, is flexible and easily assumes the illustrated position with pulleys 122, underneath basket 118. As mentioned above, bag 204 has a weight 206 at the end opposite from where attached to frame assembly 181. While under basket 118, weight 206 keeps bag 204 in a vertical position as illustrated. In the illustrated position, contents from water W may be collected within bag 204.

It is noted that the instant invention has two collector assemblies 180. While one collector assembly 180 is near the surface of water W, as seen in FIG. 1a, the other collector assembly 180, not seen, is in position under basket 118. After a predetermined amount of time, the collector assembly 180 as seen in FIG. 1a, is positioned underneath basket 118, as seen in FIG. 1b, with winch assemblies 30. That way, while in operation, one collector assembly 180 may be positioned underneath basket 118 to collect ionic constituents that exist in seawater, while the other collector assembly 180 is near the surface of water W being vacuumed for the ionic constituents, as seen in FIG. 1a.

As seen in FIG. 1c, pipe 104 has separator 292 separating passageways 288 and 290. Passage ways 288 and 290 are for oxygen gas and hydrogen gas respectively that are then stored in tanks 31 and 32 respectively.

Seen in FIG. 1d, is basket 118 having cavity 120. Cavity 120 determining the ionic concentration of water W surrounding cylindrical tanks 242, seen in FIG. 1b. Suspended within basket 118, is electrolysis tank assembly 240, better seen in FIG. 2. Electrolysis tank assembly 240 comprises two cylindrical tanks 242. Supporting cylindrical tanks 242 to each other is connector 244 and ionic bridge 286.

Seen in FIG. 2, is one cylindrical tank 242 of electrolysis tank assembly 240. It is noted that both cylindrical tanks 242 are structurally identical with the exception of coil 272, therefore only one cylindrical tank 242 is illustrated. Specifically, in one cylindrical tank 242, coil 272 is an anode coil, and in the other cylindrical tank 242, coil 272 is a cathode coil.

Secured at the base of cylindrical tank 242 is coil 272. Coil 272 is secured to the inside wall of cylindrical tank 242 with frame 276. Secured to frame 276 is a plurality of separators 278, which keep coil 272 spiraled at a predetermined degree. As illustrated, coil 272, within cylindrical tank 242, is submerged in water W, which in the preferred embodiment is seawater. Above coil 272 is generator assembly 259. Generator assembly is secured with connector 280. Directly above generator assembly 259, is shroud 258. Shroud 258 is diagonally shaped, yet has a flat top surface, and is secured to the inside wall of cylindrical tank 242. As previously mentioned, coil 272 is submerged in water W, however it is noted that water does not reach the elevation where generator assembly 259 is. At the uppermost diagonal section of shroud 258 is valve 264. Immediately above shroud 258 is turbine 254. Turbine 254 comprises blades 256. Shaft 252 extends from generator assembly 259 through turbine 254 to turbine 246. Turbine 246 has two sets of blades, 248 and 250, which are secured onto separating wall 249. In addition, extending from shroud 258 and connecting to turbine 246 is pipe 262.

As better seen in FIG. 2a, shaft 252 is centrally disposed and is secured onto turbine 246. Pipe 262 however, is secured onto plate 247, which covers the perimeter section defined by blades 248, seen in FIG. 2.

Extending downwardly through pipe 104, seen in FIG. 1c, and snugly contouring cylindrical tank 242, is electrical cable 270. Electrical cable 270 secures onto electrical box 268. Extending from electrical box 268 is cable 282, which connects to coil 272. Cable 282 has water measurement device 267 to determine the water level above coil 272. Also extending from electrical box 268, is cable 266, which connects to generator assembly 259.

For initial operation, electrical power is transmitted from a power supply, not shown, through electrical cable 270, to electrical box 268, and finally to electrical contacts 274, which charges coil 272. Upon the charging of coil 272, electrolysis starts to occur. Assuming the illustrated coil 272 is the anode coil, oxygen gas is emitted, the cathode coil emitting hydrogen gas and electrolysis occurring with ionic bridge 286, seen in FIG. 1b and 2. The oxygen gas rises and starts to develop pressure above the water W, underneath generator assembly 259 and shroud 258. The gas escapes through valves 260 and 264 when the gas pressure overcomes the force of valves 260 and 264. The gas that escapes through valve 260 travels through generator assembly 259, into turbine 254, and out of turbine 254 through blades 256. Turbine 254 is rotatably mounted onto shaft 252. The effect of gas G exiting through blades 256 causes shaft 252 to spin. Gas G cools generator assembly 259 adding to the kinetic energy of gas G, which as a result, heats blades 256 of turbine 254. Upon exiting turbine 254, the gas continues to rise and passes through blades 250 of turbine 246. Turbine 254 and blades 250 of turbine 246 are rotatably mounted upon shaft 252, enabling blades 256, 248, 250 and shaft 252 to all spin in the same direction. The gas that escapes through valve 264 travels through pipe 262 and onto blades 248 of turbine 246. The effect of the gas exiting through blades 248 causes them to rotate. It is noted that blades 250 pump gas G to outlet 284. It is further noted that turbine 246 has separating wall 249, which is fixed to blades 248 and 250. When there is sufficient rotation of turbine 254 and the blades of turbine 246 to operate generator assembly 259, the power supply from electrical cable 270 is disengaged and electrical power to contacts 274 is supplied from generator assembly 259 through cable 266, to electrical box 268, and through cable 282. A sufficient power supply from generator assembly 259 is realized as long as the gas G escaping through outlet 284 is replaced by an equal amount of gas from electrolysis. Since we assumed that coil 272 is the anode coil, gas G escaping through outlet 284 travels through passageway 288, seen in FIG. 1b, which is within pipe 104, to tank 31. Tank 32 stores hydrogen gas that flows through passageway 290.

As seen in FIG. 3, basket 118 extends from cables 116. Basket 118 is substantially hollow to partially house electrolysis tank assembly 240, and has cavity 120 at its lowermost end. In the illustrated position, ionic constituents and metals present in seawater may be collected in bag 204 as the electrolysis operation is occurring.

Best seen in FIG. 4, is collector assembly 180. Collector assembly 180 has frame assembly 181. Secured onto cables 102 beneath frame assembly 181 is net 202 and rail 200. Net 202 and rail 200 are of a predetermined length to prevent bag 204 from becoming entangled with cables 102. Perpendicularly extending from connector 186 of frame assembly 181, is connector 188. Connectors 188 extend a predetermined distance and terminate with rod 198. Each set of rods 194 and 196 are angled slightly outwardly to allow bag 204 to rest in between each respective set. Bag 204 is additionally secured onto frame assembly 181 with buttons 210, whereby bag 204 has a plurality of holes, not seen, that are filled by buttons 210 to secure bag 204.

As seen in FIG. 5, to stabilize platform assembly 20, or a series of them connected, is stabilizing system 70. Stabilizing system 70 has buoy assemblies 72 at each side of platform assembly 20 as illustrated. Buoy assemblies 72 float on each side of platform assembly 20 to stabilize against waves of water W. Buoy assembly 72 has housing 76 with dome 74 secured thereon. Dome 74 is shaped with curvature to allow water W to easily flow over in the event of waves. Extending from housing 76 are rings 78, where each cable 80 is secured therethrough.

Weights 64 provide additional stabilization for platform assemblies 20. It is noted that only one side is shown since the opposite side is identical. Weights 64 are set on the floor of body of water W. Extending from weights 64 are cables 60, which are secured to pontoons 42. Pontoons 42 are set at a predetermined depth and are buoyant. Weights 58 hang below pontoons 42 to keep them at a predetermined depth. Weights 58 have eyebolts 56. Secured to eyebolts 56 are springs 54, which secure to end point 52 of pulley 50. Additionally, cable 36 is also secured to eyebolts 56. Weights 64 and 58 are of a predetermined mass to stabilize instant invention 10. Viewing FIG. 5 from left to right, cable 60 is secured from weight 64 at eyebolt 62, to knot 48, which splits cable 60, defining cables 46. Cables 46 are secured to eyebolts 44 of pontoon 42. In addition, cables 36 extend from weight 58, through spring 54, over pulley 50, through guides 40 of float 38, and through guides 34 too keep platform assembly 20 steady. A similar system as described above may be utilized to keep buoy assemblies 72 stabilized.

It is noted that all the parts that make up the instant invention are manufactured, or covered, with materials that do not conduct electricity.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electrolysis system, comprising:
   A) a platform assembly having first and second ends floating on a body of saltwater, said platform assembly having winch assemblies at said first and second ends to winch first and second cables, said platform assembly further having first and second storage tanks fixedly secured to store oxygen and hydrogen gas respectively;
   B) a stabilizing assembly to stabilize said platform assembly on said body of saltwater,
   C) a pulley assembly having first and second pulleys on said first and second cables respectively, said pulley assembly having an anchor in said body of saltwater; and
   D) an electrolysis tank assembly having first and second cylindrical tanks secured between said first and second pulleys, said first and second cylindrical tanks connected to one another by an ionic bridge, said first cylindrical tank having an anode coil connected to an external power supply from said platform assembly and said second cylindrical tank having a cathode coil connected to said external power supply, said first and second cylindrical tanks each having a generator and at least one turbine assembly connected to each other by a shaft.

2. The electrolysis system set forth in claim 1, having means to produce said oxygen and hydrogen gas with electrolysis, wherein said electrolysis tank assembly is positioned at a predetermined depth within said body of saltwater, said external power supply initiates operation of said anode and cathode coils as an electrical current is applied creating said oxygen and hydrogen gas respectively, said oxygen and hydrogen gas in their respective said first and second cylindrical tanks travel through said at least one turbine assembly turning said generator with said shaft, said generator producing sufficient said electrical current for said electrolysis to disengage said external power supply, and said oxygen and hydrogen gas stored in said first and second storage tanks.

3. The electrolysis system set forth in claim 2, further comprising at least one collector assembly fixedly secured to said first and second cables, said at least one collector assembly having a generally rectangular frame assembly, said frame assembly having a weighted bag removably secured thereon.

4. The electrolysis system set forth in claim 3, having means to collect ionic constituents in said weighted bag present in said body of saltwater with gravity, when said rectangular frame assembly is positioned below said pulley assembly.

5. The electrolysis system set forth in claim 4, wherein said platform assembly further comprises first and second vacuums to vacuum said ionic constituents from said weighted bag when said collector assembly is at said first or second ends.

6. The electrolysis system set forth in claim 5, wherein said weighted bag has a vacuum hose that connects to said first and second vacuums.

7. The electrolysis system set forth in claim 6, wherein said first and second cables have a net secured onto one end of said rectangular frame assembly to prevent said weighted bag from becoming entangled with said first and second cables.

* * * * *